(12) United States Patent
Juels

(10) Patent No.: US 8,792,862 B1
(45) Date of Patent: Jul. 29, 2014

(54) PROVIDING ENHANCED SECURITY FOR WIRELESS TELECOMMUNICATIONS DEVICES

(75) Inventor: Ari Juels, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 105 days.

(21) Appl. No.: 13/076,534

(22) Filed: Mar. 31, 2011

(51) Int. Cl.
*H04W 12/06* (2009.01)

(52) U.S. Cl.
USPC ........................................ 455/411; 455/412.1

(58) Field of Classification Search
USPC ........................................ 455/410, 411, 412.1
See application file for complete search history.

(56) References Cited

U.S. PATENT DOCUMENTS

| | | | |
|---|---|---|---|
| 6,968,179 B1* | 11/2005 | De Vries | 455/414.1 |
| 2009/0150441 A1* | 6/2009 | Johnsen et al. | 707/104.1 |
| 2010/0145702 A1* | 6/2010 | Karmarkar | 704/258 |
| 2010/0198728 A1* | 8/2010 | Aabye et al. | 705/44 |
| 2011/0014933 A1* | 1/2011 | Karmarkar et al. | 455/466 |
| 2012/0203925 A1* | 8/2012 | Curcio et al. | 709/235 |
| 2012/0296941 A1* | 11/2012 | Cao et al. | 707/802 |
| 2012/0330769 A1* | 12/2012 | Arceo | 705/21 |

OTHER PUBLICATIONS

Czeskis, A. et al., RFIDs and Secret Handshakes: CCS '08 Proceedings of the 15th ACM Conference on Computer & Communications Security, ACM New York, NY USA, pp. 479-490.
U.S. Appl. No. 12/967,239, filed Dec. 14, 2010, Ari Juels.

* cited by examiner

*Primary Examiner* — Cong Tran
(74) *Attorney, Agent, or Firm* — Krishnendu Gupta; Jason A. Reyes; John T. Hurley

(57) ABSTRACT

A method and system for use in providing enhanced security for wireless telecommunications devices is disclosed. In at least one embodiment, the method and system comprises providing a first sensor, included in a wireless telecommunications device, for helping derive a first set of physical context data associated with the wireless telecommunications device; providing a second sensor, included in an authentication device, for helping derive a second set of physical context data associated with the wireless telecommunications device; and using the first and second set of physical context data to help determine whether the wireless telecommunications device has been moved in a gesture that is consistent with a use of the wireless telecommunications device for a specific purpose.

20 Claims, 5 Drawing Sheets

PROVIDING ENHANCED SECURITY FOR WIRELESS TELECOMMUNICATIONS DEVICES

BACKGROUND

1. Field of the Invention

The present invention relates to providing enhanced security for wireless telecommunications devices.

2. Description of Related Art

The use of portable electronic devices and telecommunication devices has increased rapidly in recent years. Likewise, the use of such devices to conduct short-range, contactless, wireless transactions is increasing. For example, Near Field Communication (NFC) or Radiofrequency Identification (RFID) technology enables the wireless exchange of data between devices over a short distance. This technology, for instance, allows for the exchange of credit card information with a merchant terminal by tapping or waving the NFC- or RFID-enabled device within a close proximity to the merchant terminal. The merchant terminal can then read and use the information to perform a commercial transaction.

Using wireless communication technology to exchange sensitive information may present security and privacy concerns. For example, an NFC or RFID device may include several features that may present vulnerabilities, e.g., the device may use an external power supply, communicate wirelessly, communicate unknowingly, include persistent state memory that can be modified by a reader during a transaction, and perform computation. These features may be used by attackers to perform tracking, scanning, and man-in-the-middle attacks.

A tracking attack may occur when a potentially legitimate merchant uses a wireless reader to extract data from a device. A scanning attack may be performed by practically anyone at any time, such as in a crowded subway car. In this attack, an unauthorized reader may be used to extract information from a device. A man-in-the-middle attack is possible when a device is able to successfully mimic end-point devices, e.g., a purchaser's device and/or a merchant terminal. Such an attack can result in the purchaser's device and the merchant device exchanging information without knowledge of a clandestine device intercepting and replaying, or relaying, potentially private information.

Countermeasures can be taken to help protect against such attacks.

SUMMARY OF THE INVENTION

A method and system for use in providing enhanced security for wireless telecommunications devices is disclosed. In at least one embodiment, the method and system comprises providing a first sensor, included in a wireless telecommunications device, for helping derive a first set of physical context data associated with the wireless telecommunications device; providing a second sensor, included in an authentication device, for helping derive a second set of physical context data associated with the wireless telecommunications device; and using the first and second set of physical context data to help determine whether the wireless telecommunications device has been moved in a gesture that is consistent with a use of the wireless telecommunications device for a specific purpose.

BRIEF DESCRIPTION OF THE DRAWINGS

Features and advantages of the present invention will become more apparent from the following detailed description of exemplary embodiments thereof taken in conjunction with the accompanying drawings in which.

DESCRIPTION OF EMBODIMENT(S)

Described below is a technique for use in providing enhanced security for a wireless telecommunications device. In at least one embodiment, the technique may be used to ensure that a telecommunications device exchanges information with another device only when the telecommunications device is moved in a gesture indicating an intent to do so. In some embodiments, detecting the motion of the telecommunications device and determining whether there is an intent to exchange information may be performed by one or more devices. This technique may provide enhanced security for a telecommunications device by helping ensure that the device is not unintentionally exchanging data with another device.

Figure 1:
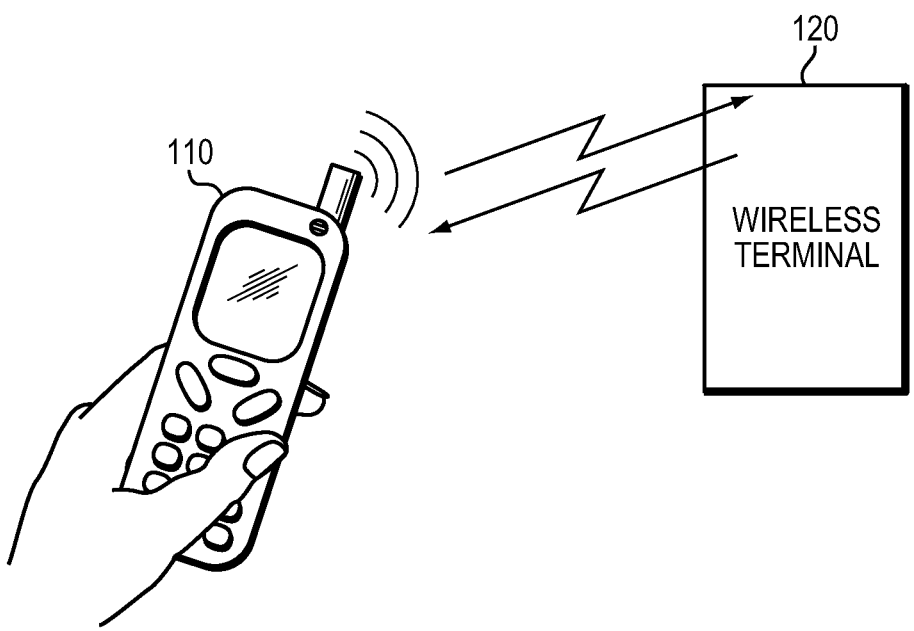
FIG. 1 illustrates devices that may be used with an embodiment of the technique described herein.

Referring to FIG. 1, illustrated is a device being used in accordance with an embodiment of the current technique. As shown, device 110 can be a telecommunications device wirelessly communicating with device 120. In some example embodiments, device 120 may be a merchant terminal, a public-transportation terminal, an access control terminal, an authorization terminal, a telecommunications device, or an identification terminal. These examples of device 120 may all exchange information with device 110 to perform a specific operation. For example, a merchant terminal may obtain credit card information from device 110 to process a commercial transaction, or an access control terminal may obtain information from device 110 to determine whether a user and/or device is authorized to access a particular area or resource.

Device 110 can take various forms in various embodiments of the current technique, provided that the device 110 performs the functions required of the device 110 for secure authentication. The device 110 can be implemented in packages having a wide variety of shapes and form factors. For example, in some embodiments the device 110 can be, or be incorporated within, a telecommunications device such as a cellular telephone, or a cellular telephone with specialized embedded hardware adapted to interact with the cellular telephone's circuitry, such as a SIM card. In other embodiments, the device 110 can be an RFID-enabled credit-card sized and shaped device, or can be much smaller or much larger. One credit-card sized embodiment of the device 110 includes a microprocessor with on-board memory, a power source, and a small LCD display. Embodiments may optionally include a keypad or buttons for PIN entry, entry of authentication information requests, or for other entry or interaction with the device 120. In another embodiment, a credit-card sized device 110 may include a processor with on-board memory that may be used as a "smart card," that can be installed into another device that provides power and/or an interface. In still other embodiments, device 110 can be a e-passport. Other sizes, shapes, and implementations are possible without departing from the spirit of the invention.

In some embodiments, device 110 may exchange information with device 120 only upon indication of an intent to do so. In at least one embodiment, the requisite intent may be found when device 110 is moved in a gesture that is consistent with a use of device 110 for a specific purpose. For example, as illustrated in FIG. 1, when a wireless device such as device 110 is being used to initiate a transaction with a merchant terminal such as device 120, a "tapping" gesture with the device is customarily performed. Alternatively, a "swiping" gesture may be performed. In accordance with an embodiment of the current technique, one of these gestures may be required before device 110 is activated to allow for information to be exchanged between device 110 and the merchant terminal. Thus, no commercial transaction may occur using device 110 if it has not been gestured in a way that conveys the intent to initiate a commercial transaction.

Figure 2:
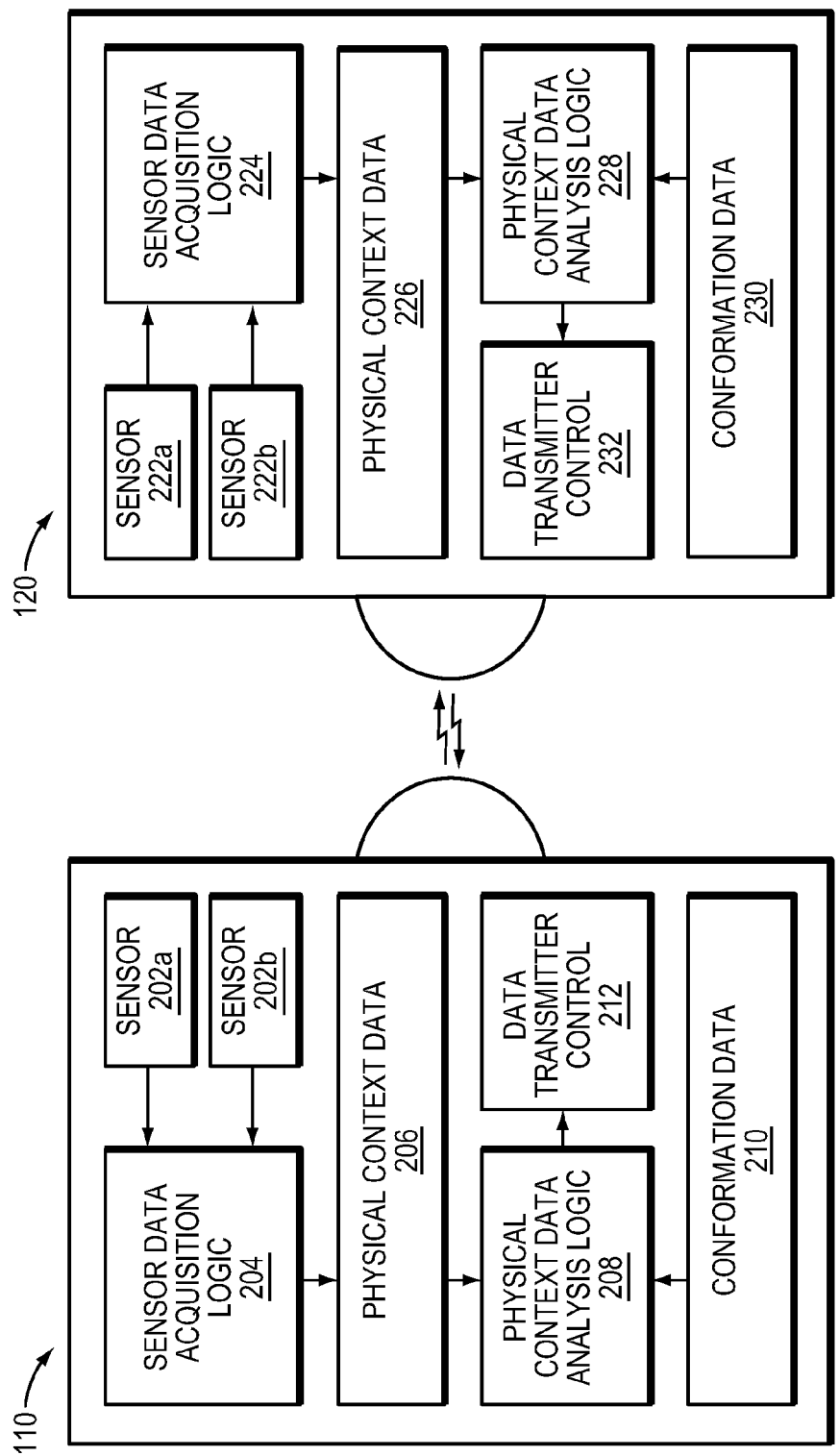
FIG. 2 illustrates a component diagram that may be used with an embodiment of the technique described herein.

Referring now to the example embodiment of FIG. 2, shown is a component diagram of devices 110 and 120. As shown, device 110 includes sensors 202a and 202b, which are capable of detecting motion. In a particular embodiment, device 110 may also include sensor data acquisition logic 204 that may be used to help produce physical context data 206. Physical context data analysis logic 208 may perform analysis of physical context data 206 using conformation data 210. Data transmitter control 212 may be included to control data transmittal.

Device 120, as shown in FIG. 2, includes sensors 222a and 222b, which are capable of detecting motion of a device such as device 110. In a particular embodiment, device 120 may also include sensor data acquisition logic 224 that may be used to help produce physical context data 226 associated with a device such as device 110. Physical context data analysis logic 228 may perform analysis of physical context data 226 using conformation data 230. Data transmitter control 232 may be included to control data transmittal.

Although both device 110 and device 120 each include two sensors in FIG. 2, any number and/or variety of sensors may be used in accordance with the current technique. In some embodiments, sensors may also be integrated with other components internal or external to the devices.

One example sensor that is capable of detecting motion is an accelerometer. An accelerometer can measure a device's acceleration or de-acceleration in one or more dimensions and can, therefore, be used to help determine how device 110 is being moved.

Another example sensor is a gyroscope, which is a sensor that can measure orientation. In at least one embodiment, a gyroscope may be used to adjust measurements received from an accelerometer or other sensors. In some embodiments, an accelerometer and a gyroscope can be used to help determine, for example, how the device is being held, at what speed the device is being moved, and in which direction the device is being moved. Accordingly, in an embodiment where device 120 is a merchant terminal, accelerometer and/or gyroscope measurements acquired by device 110 may be used to help detect movement of device 110 and to help determine whether the device has been moved in a required tapping or swiping gesture.

Other motion-sensing or gesture recognizing sensors may be used in addition to or instead of an accelerometer and/or gyroscope. For example, devices 110 and 120 may each include a built-in camera that can be used to help detect motion. In an example embodiment, a camera may capture one or more (e.g., a series of) images that can be compared with each other to determine variations that would indicate movement. For example, the images may indicate lighting changes or changes in the location of a fixed object. In another example embodiment, the devices 110 and 120 may use a camera for computer vision (e.g., pattern recognition) to help determine whether device 110 is being used for an intended purpose. For instance, a camera may capture images that can be analyzed using pattern recognition to help determine that device 110 is being moved toward a particular wireless terminal (e.g., device 120).

A microphone may also be used to help detect motion. For instance, particular sounds a microphone captures may be indicative of movement. A sensor may also be able to help determine movement by capturing vibrations. Another sensor may detect movement by recognizing a change associated with an energy wave, such as a change in microwave signal frequency. Bluetooth or other short-range wireless communication technologies may also be used to detect movement. Additionally, geographical positioning technology such as the Global Positioning System (GPS) may be used to detect motion of a device. In other words, any device that is capable of detecting motion in any way can be a sensor for use in an embodiment of the current technique.

Figure 3:
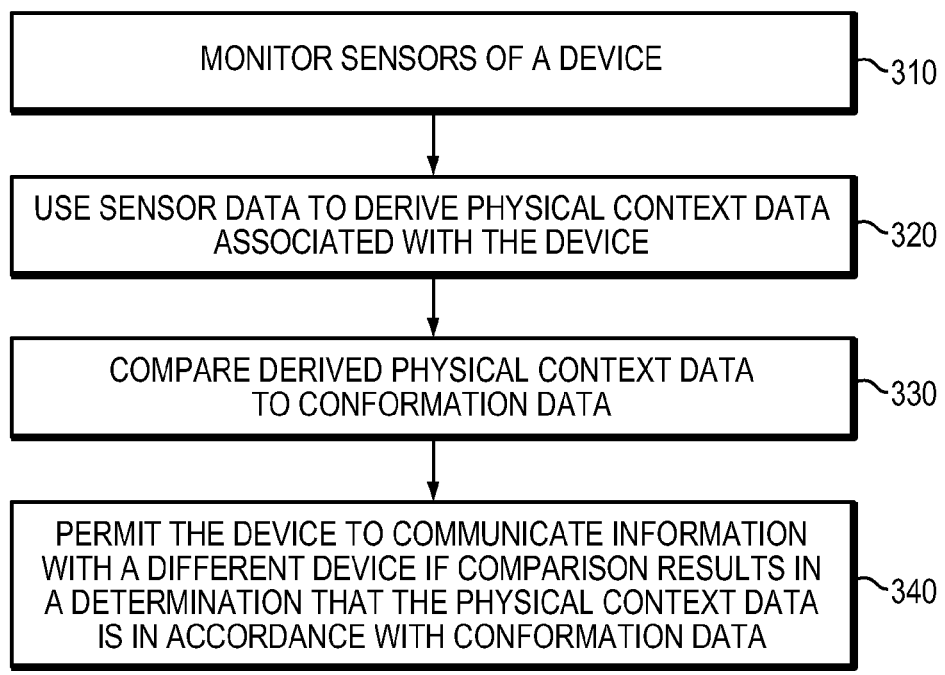
FIGS. 3-5 are flowcharts that may be used with an embodiment of the technique described herein.

Further explanation of the current technique and the components included in FIG. 2 will be provided with reference to FIGS. 3, 4 and 5 below. FIG. 3 provides a flowchart that can be used with an embodiment of the current technique. In at least one embodiment, device 110, as illustrated in the example embodiment of FIG. 2, may include sensor data acquisition logic 204, which may be responsible for monitoring one or more outputs of sensors 202a and 202b (step 310). For instance, in some embodiments, sensor data acquisition logic 204 may acquire and digitize analog sensor data produced by sensors 202a and 202b. In yet another embodiment, sensor data acquisition logic 204 may also be responsible for performing processing of data produced by sensors 202a and 202b. For example, if multiple sensors are used to determine movement of device 110, sensor data acquisition logic 204 may be responsible for acquiring, digitizing, consolidating, and manipulating sensor data to put the data in a better form for analysis.

In some embodiments, applying logic 204 to data produced by sensors 202a and 202b may result in physical context data 206 (step 320). In at least one embodiment, physical context data analysis logic 208 may compare physical context data 206 to conformation data 210 (step 330). Conformation data 210 may contain data that can be used to help determine whether device 110 was moved in a gesture that is consistent with a use of device 110 for a specific purpose. For example, in some embodiments, conformation data 210 may include data values that represent a predetermined acceptable range of acceleration or orientation for device 110 when used for commercial transactions. In an example embodiment, conformation data 210 may also include data to be used to help analyze images of a merchant terminal captured by a camera of device 110. Accordingly, if device 110 comes within a close proximity to a merchant terminal, device 110 may nevertheless remain unactivated for the purpose of conducting a commercial transaction unless the device is held and moved in such a way as to produce physical context data 206 that physical context data analysis logic 208 determines to be in accordance with conformation data 210.

In some embodiments, conformation data 210 may include movement data that is associated with one or more purposes. For example, in at least one embodiment, device 110 may also be enabled to transmit data for the purpose of enabling access to a resource or a physical location. In an example embodiment, conformation data 210 may contain data that can be used to determine whether device 110 was moved in a gesture that is consistent with how such a device is typically moved when seeking door entry. In another example embodiment, conformation data 210 may contain data that can be used to determine whether device 110 was moved in a gesture that is consistent with how such a device is typically moved when seeking to complete a commercial transaction. Any number of other purposes for which device 110 may be moved may also contain respective conformation data.

Once physical context data analysis logic 208 determines that a device has been moved in such a way as to produce physical context data 206 that is in accordance with conformation data 210, data transmitter control 212 may permit the transfer of data to device 120 (step 340). It should be noted that in some embodiments the comparison and determination steps may be performed partially or completely by a different device. For instance, physical context data 206 may be transferred to device 120, which can then perform the comparison and determination steps discussed above. What data can be transferred may depend on the specific embodiment. In some embodiments, data may be private access or transaction data needed to complete a desired action such as, for example, unique identification numbers, credit card information, birth date, location, name, and address. In at least one embodiment, data may include a description of the gesture in which device 110 was moved.

In some embodiments, data transmitter control 212 may also require that a specific signal be received at device 110 from device 120 before the transfer of data is permitted. For instance, a merchant terminal may emit a short-range signal that can be detected by device 110. In these embodiments, the signal may indicate that device 110 is at a location from which data may be transferred with device 120.

In some embodiments in accordance with the current technique, if device 110 has been moved in a gesture that is consistent with a use of device 110 for a specific purpose, device 110 and/or device 120 may display information to a user of device 110 and/or device 120. In at least one embodiment, the devices 110 and 120 may use a display screen to request confirmation from a user that a particular data exchange is desired, or the display screen may be used to convey information to the user in regards to an exchange of information. For instance, in a case where device 110 is a telecommunications device with a display screen and key pad and device 120 is a wireless merchant device, the display screen can be used to request confirmation for a commercial transaction and/or display information about the commercial transaction when the device is, for example, moved in a swiping gesture in relation to the merchant device indicating that a transaction may be desired. Alternatively, or in addition, the merchant device may display the same or different information to the user.

In some embodiments, device 110 may transmit information to one or more other devices in addition to or in place of device 120. In at least one example embodiment, device 110 may detect and communicate to another device that it is being used for an unauthorized purpose or an attempt to use device 110 for an unauthorized purpose has occurred. Device 110 may communicate this information, for example, to a merchant, the owner of device 110, or public authorities, by transmitting the information to another device. For example, if device 110 detects that an unauthorized terminal has attempted to obtain information from device 110 when device 110 was not activated by a specific movement to exchange information with the terminal, device 110 may communicate information about the attempt to the appropriate authorities, for example, via a wireless or cellular connection.

Figure 4:
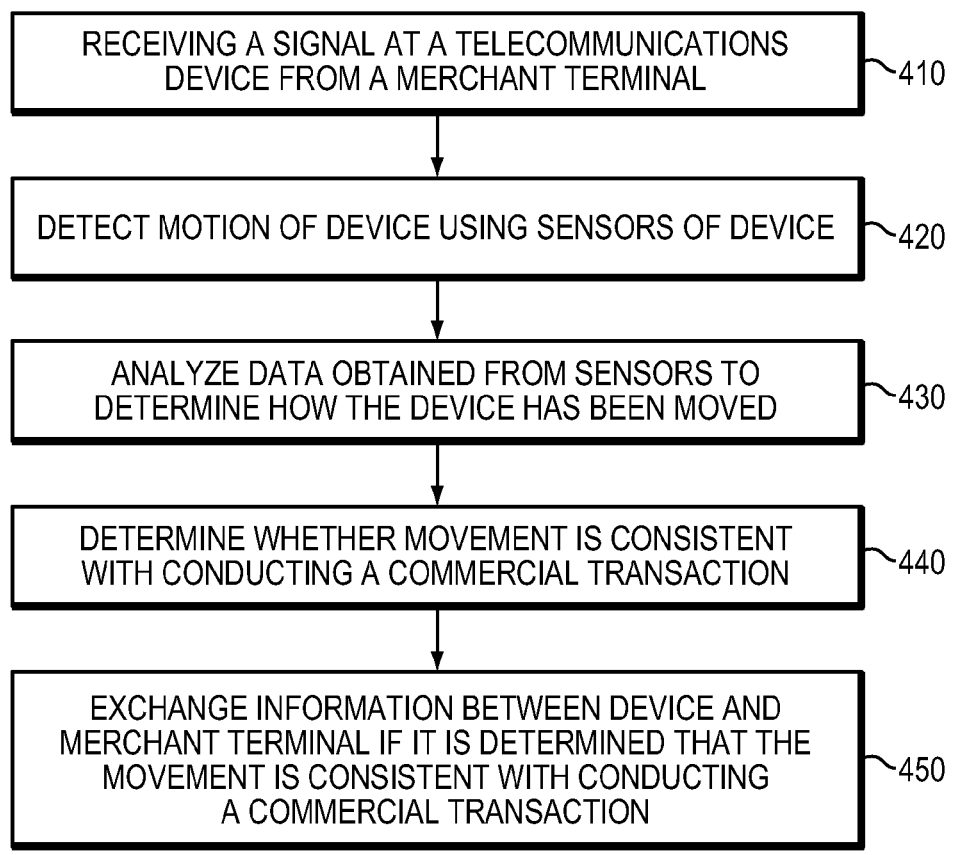

Referring now to FIG. 4, shown is a flowchart illustrating processes that may be used with an example embodiment of the current technique where a telecommunications device is being used to perform a commercial transaction. The telecommunications device may receive a signal from a merchant terminal device indicating that the devices are within range to successfully complete a wireless commercial transaction (step 410). Sensors of the telecommunications device may then be used to detect whether the device has been moved (step 420). Modern telecommunications devices often have several built-in sensors that can be used to help detect motion such as, for example, an accelerometer, gyroscope, and a camera. Next, data provided by these sensors can be used to determine the device's orientation, acceleration, and direction of movement (step 430). The data can be analyzed to determine whether the telecommunications device was moved in a gesture that is consistent with conducting a commercial transaction (step 440). For instance, the device may analyze the motion data to determine whether it was moved in a tapping or swiping gesture. Moreover, it may analyze the data to determine whether the speed at which the device was moved is within a predetermined range of speeds that are typical of a commercial transaction gesture. If it is determined that the telecommunications device was moved in a gesture that is consistent with such a transaction, the device may exchange information with the merchant device to complete the transaction (step 450).

In some embodiments, device 120 may perform steps that are the same as or similar to the steps described with reference to FIGS. 3 and 4. For example, device 120, as illustrated in the example embodiment of FIG. 2, may include sensor data acquisition logic 224, which may be responsible for monitoring one or more outputs of sensors 222*a* and 222*b*. As with the sensor data acquisition logic 204 of device 110, data acquisition logic 224 of device 120 may be responsible in some embodiments for acquiring, digitizing, consolidating, and manipulating sensor data to produce physical context data 226. Furthermore, physical context data analysis logic 228 may compare the produced physical context data 226 to conformation data 230. Depending on the result of the comparison, the physical context data analysis logic 228 of device 120 can determine whether device 110 has been moved in a way that is consistent with a use of device 110 for a specific purpose. Alternatively, the comparison and determination steps may be partially or completely performed by a different device such as, for example, device 110.

Based on the determination made by context data analysis logic 228, data transmitter control 232 may, in some embodiments, permit or deny the transfer of data to device 110 from device 120 and/or from device 110 to device 120. For example, in an embodiment where device 110 only transmits data when a particular signal is received from a device such as device 120, whether device 120 emits the signal may depend on the determination made by context data analysis logic 228. This may be the case regardless of whether context data analysis logic 208 of device 110 has determined that device 110 has been moved in a gesture that is consistent with a use of device 110. In an alternative embodiment, device 120 may permit the transfer of data regardless of the determination, but may, for example, prevent the initiation of a transaction using the transferred data if it is determined that the device was not moved in a way that is consistent with a use of device 110 for a specific purpose. Also, in some embodiments, device 120 may transmit information to one or more other devices in addition to or in place of device 110 based on the determination. For example, device 120 may detect and communicate to another device that device 110 being used for an unauthorized purpose or an attempt to use device 110 for an unauthorized purpose has occurred. Device 120 may then communicate this information, for example, to a merchant, the owner of device 110, or public authorities, by transmitting the information to another device via, e.g., a wireless or cellular connection.

In another embodiment, physical context data 206 collected by device 110 and physical context data 226 collected by device 120 may be compared to determine whether both device 110 and device 120 detected a same or different motion of device 110. Where the comparison is performed and how the results of a comparison are responded to may vary across different embodiments. For example, the comparison may be performed on device 110 or instead on device 120, or in some embodiments, both devices may perform all or part of the comparison. In some embodiments, the devices may not be enabled to exchange data unless both devices detected the same or a similar motion Referring now to FIG. 5, shown is a flowchart illustrating steps that may be used in an embodiment of the current technique as described above. In this embodiment, device 110 may compare context data collected by device 110 sensors to conformation data to determine whether device 110 has been moved in a way that is consistent with a use of device 110 (step 510). Similarly, device 120 may compare context data collected by device 120 sensors to conformation data to determine whether device 110 has been moved in a way that is consistent with a use of device 110 (step 520). Additionally, the context data collected by device 110 may be compared to the context data collected by device 120 (step 530). If both devices 110 and 120 determine that device 110 has been moved in a way that is consistent with a use of device 110 and it is determined that the context data collected by both devices 110 and 120 is the same, the specific use for which device 110 was moved may proceed (step 540).

Figure 5:
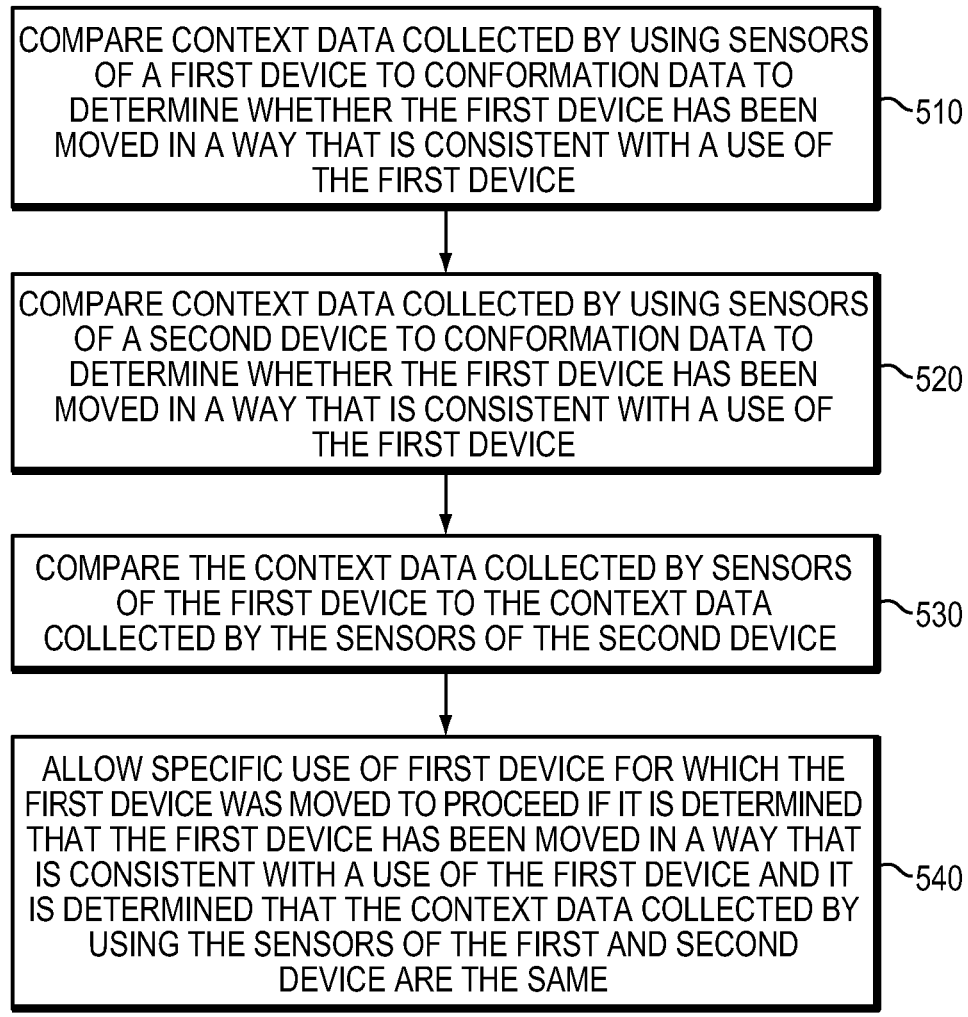

It should be noted that any one or more of the steps of FIG. 5 may be performed partially or completely by other devices depending on the particular embodiment. Also, the order in which the steps are performed or whether a step is performed at all may vary depending on the embodiment. For example, steps 510 and 520 may be performed simultaneously in some embodiments. Alternatively, step 520 may only be performed if it is determined in step 510 that device 110 was moved in a way that is consistent with a use of device 110.

Also, steps in addition to the steps in FIG. 5 may also be included in an embodiment. For instance, device 110 and/or device 120 may determine whether the times at which motion of device 110 was detected by device 110 and device 120 are the same before exchanging information. In yet another embodiment, device 110 and/or device 120 may determine whether both devices where moved in a similar and synchronous motion towards one another before exchanging information.

Embodiments may implement the technique herein using code executed by a processor. For example, an embodiment may implement the techniques herein using code which is executed by a processor of the device on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in providing enhanced security for wireless telecommunications devices, the method comprising:
   providing a first sensor, included in a wireless telecommunications device, for helping derive a first set of physical context data associated with the wireless telecommunications device;
   providing a second sensor, included in a separate secure authentication device, for helping derive a second set of physical context data associated with the wireless telecommunications device;
   securely transmitting the first set of physical context data to the authentication device;
   at the authentication device, using the first and second set of physical context data to help determine whether the wireless telecommunications device has been moved in a gesture that is consistent with a use of the wireless telecommunications device for a specific purpose; and
   permitting further communication between the wireless telecommunications device and the authentication device based on a determination that the gesture that is consistent with a use of the wireless telecommunications device for a specific purpose, wherein the communication includes exchanging commercial transaction information.

2. The method of claim 1 wherein the wireless telecommunications device comprises a cellular telephone.

3. The method of claim 1 wherein the first and second sensors are selected from a group of sensors consisting of an accelerometer, gyroscope, camera, microphone, Bluetooth receiver, and a GPS receiver.

4. The method of claim 1, further comprising:
   based on the determination, enabling the wireless telecommunications device for the specific purpose.

5. The method of claim 4 wherein enabling the wireless telecommunications device requires that a signal be received at the wireless telecommunications device from the authentication device.

6. The method of claim 4 wherein enabling the wireless telecommunications device requires user confirmation.

7. The method of claim 1 wherein the specific purpose is to communicate information.

8. The method of claim 1 wherein the determination is based on a comparison of the first set of physical context data with the second set of physical context data.

9. The method of claim 1 wherein the determination is performed by the wireless telecommunications device.

10. The method of claim 1 wherein the determination is performed by the authentication device.

11. A system for use in providing enhanced security for wireless telecommunications devices, the system comprising:
   first logic configured to provide a first sensor, included in a wireless telecommunications device, for helping derive a first set of physical context data associated with the wireless telecommunications device and securely communicate the first set of physical context data to the authentication device;
   second logic configured to provide a second sensor, included in a separate secure authentication device, for helping derive a second set of physical context data associated with the wireless telecommunications device;

third logic configured to use the first and second set of physical context data to help determine whether the wireless telecommunications device has been moved in a gesture that is consistent with a use of the wireless telecommunications device for a specific purpose; and fourth logic configured to permit further communication between the wireless telecommunications device and the authentication device based on a determination that the gesture that is consistent with a use of the wireless telecommunications device for a specific purpose, wherein the communication includes exchanging commercial transaction information.

12. The system of claim 11 wherein the wireless telecommunications device comprises a cellular telephone.

13. The system of claim 11 wherein the first and second sensors are selected from a group of sensors consisting of an accelerometer, gyroscope, camera, microphone, Bluetooth receiver, and a GPS receiver.

14. The system of claim 11, further comprising:
based on the determination, fourth logic enabling the wireless telecommunications device for the specific purpose.

15. The system of claim 14 wherein enabling the wireless telecommunications device requires that a signal be received at the wireless telecommunications device from the authentication device.

16. The system of claim 14 wherein enabling the wireless telecommunications device requires user confirmation.

17. The system of claim 11 wherein the specific purpose is to communicate information.

18. The system of claim 11 wherein the determination is based on a comparison of the first set of physical context data with the second set of physical context data.

19. The system of claim 11 wherein the determination is performed by the wireless telecommunications device.

20. The system of claim 11 wherein the determination is performed by the authentication device.

* * * * *